United States Patent
Lingafelt et al.

(10) Patent No.: US 7,882,178 B2
(45) Date of Patent: Feb. 1, 2011

(54) METHOD AND SYSTEM FOR USING BUSINESS RULES TO CONTROL INVITATIONS TO JOIN INSTANT MESSAGE COLLABORATIONS

(75) Inventors: Charles Steven Lingafelt, Durham, NC (US); David Paul Merrill, New Paltz, NY (US); John Elbert Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 11/850,090

(22) Filed: Sep. 5, 2007

(65) Prior Publication Data

US 2009/0063639 A1 Mar. 5, 2009

(51) Int. Cl.
G06F 15/16 (2006.01)
(52) U.S. Cl. ...................................... 709/204; 709/227
(58) Field of Classification Search ......... 709/204–207; 705/8–9
See application file for complete search history.

(56) References Cited

U.S. PATENT DOCUMENTS

| 7,679,518 B1* | 3/2010 | Pabla et al. | 340/573.1 |
|---|---|---|---|
| 2002/0029160 A1 | 3/2002 | Thompson et al. | |
| 2004/0161090 A1* | 8/2004 | Digate et al. | 379/202.01 |
| 2004/0205134 A1 | 10/2004 | Digate et al. | |
| 2005/0273382 A1 | 12/2005 | Beartusk et al. | |
| 2006/0123082 A1* | 6/2006 | Digate et al. | 709/205 |

OTHER PUBLICATIONS

White Paper Oct. 2003; Real-Time, Presence-Based Applications; Sun Microsystems, Inc; On the Web sun.com/software; 8 pages.
White Paper Feb. 2005; Sun Java TM System Instant Messaging 7 2005QI; Real-Time Collaboration for the Extended Enterprise; Sun Microsystems Inc; On the Web sun.com; 26 pages.

* cited by examiner

*Primary Examiner*—David Lazaro
(74) *Attorney, Agent, or Firm*—Schmeiser, Olsen & Watts; William E. Schiesser

(57) ABSTRACT

A method and system for using business rules to control invitations to participate in instant message (IM) collaborations. A primary invitee is invited to participate in an IM collaboration via a first IM. A business rule associated with the primary invitee is applied to determine that the primary invitee is unavailable to participate in the IM collaboration. A second IM is sent to automatically invite a backup invitee to participate in the IM collaboration. In another embodiment, a primary invitee with credentials specified by a business rule is to be invited to an IM collaboration at a specified time. An application of the business rule determines that the specified time is outside a valid invitation time period or the primary invitee's credentials are not included in a set of predefined credentials. Following the application of the business rule, a backup invitee is invited.

13 Claims, 12 Drawing Sheets

| Primary Invitee | Valid Invite Time | Invitee Credentials | Credential Authority | Wait Time | Backup Invitee | Alert Conditional | Alert Receiver |
|---|---|---|---|---|---|---|---|
| John Doe | 8:00-16:00et, weekdays, except holidays | none | -na- | 15 minutes | Howard Smith | -none- | -na- |
| 1st Shift Help Desk | 08:00-16:00et | Certificate – 123456 | IBM | 1 minute | Backup Help Desk | no response | Help Desk Mgt |
| 2nd Shift Help Desk | 16:00-24:00et | Certificate – 123654 | IBM | 1 minute | Backup Help Desk | no response | Help Desk Mgt |
| 3rd Shift Help Desk | 00:00-08:00et | Certificate – 123743 | IBM | 1 minute | Backup Help Desk | no response | Help Desk Mgt |
| Backup Help Desk | all time | Certificate – 123445 | IBM | 1 minute | Sam Jones | no response | Command Center |
| Mary Smith | Mondays, 1:00-5:00et | None | -na- | 10 minutes | none | revocation | Tivoli Event Console |

| Primary Invitee | Valid Invite Time | IM Phrase | Invitee Credentials | Credential Authority | Wait Time | Backup Invitee | Alert Conditional | Alert Receiver |
|---|---|---|---|---|---|---|---|---|
| James Smith | 8:00-16:00et | urgent case OR case 8400 | Certificate – 123456 | CA – 123456 | 5 minutes | Mary Rogers | no response | Office Administrator |
| James Smith | 08:00-16:00et | case 8432 OR case 8444 | Certificate – 123456 | CA – 123456 | 5 minutes | Jane Williams | no response | Office Administrator |

| Primary Invitee | Valid Invite Time | Identity of Requestor | Invitee Credentials | Credential Authority | Wait Time | Backup Invitee | Alert Conditional | Alert Receiver |
|---|---|---|---|---|---|---|---|---|
| James Smith | 8:00-16:00et | SM Boss | none | -na- | 10 minutes | John Williams | no response | Office Administrator |
| James Smith | 08:00-16:00et | BG Boss | Certificate – 123456 | CA – 123456 | 5 minutes | Howard Jones | no response | Office Administrator |
| James Smith | 08:00-16:00et | Client XYZ | none | -na- | 1 minute | SM Boss | no response | Office Administrator |

METHOD AND SYSTEM FOR USING BUSINESS RULES TO CONTROL INVITATIONS TO JOIN INSTANT MESSAGE COLLABORATIONS

FIELD OF THE INVENTION

The present invention relates to a system and method for using business rules to control invitations to join instant message collaborations.

BACKGROUND OF THE INVENTION

If primary invitees who are invited to join an instant message collaboration are unavailable, it is desirable to invite backup invitees. In conventional instant messaging systems, such as the system disclosed in U.S. Patent Application Pub. No. US 2004/0205134, determining the unavailability of a primary invitee and then inviting a backup invitee are based on limited, inflexible and incomplete conditions and attributes of the invitees and of the collaboration. The known instant messaging systems make invitee unavailability and backup invitee decisions based on information such as the invitee's online presence, availability filtering, who initiated the collaboration, the collaboration's topic, and whether an invitee is defined as a necessary attendee. Reliance on such limited information fails to detect other indications of an invitee's unavailability to participate in the collaboration and the related need to invite a backup invitee. Thus, there exists a need to overcome at least one of the preceding deficiencies and limitations of the related art.

SUMMARY OF THE INVENTION

In first embodiments, the present invention provides a computer-implemented method of using business rules to control invitations to participate in instant message collaborations, the method comprising:

inviting, via a first instant message sent by a computing system, a primary invitee to participate in an instant message (IM) collaboration;

applying, by the computing system, a business rule associated with the primary invitee;

determining, by the computing system and in response to the applying, that the primary invitee is unavailable to participate in the IM collaboration; and automatically inviting, via a second instant message sent by the computing system and consequent to the determining that the primary invitee is unavailable to participate in the IM collaboration, a backup invitee to participate in the IM collaboration.

A computing system, computer program product, and process for supporting computing infrastructure corresponding to the above-summarized method are also described and claimed herein.

In second embodiments, the present invention provides a computer-implemented method for using business rules to control invitations to participate in instant message collaborations, comprising:

identifying, by a computing system, a primary invitee to be invited to participate in an instant message (IM) collaboration via a first instant message to be sent at a specified time;

applying, by the computing system, a business rule associated with the primary invitee, the business rule associating the primary invitee with one or more credentials;

determining, by the computing system and in response to the applying, that a condition for inviting a backup invitee is satisfied, wherein the condition is selected from the group consisting of the specified time being outside a valid invitation time period and none of the one or more credentials being included in a set of one or more predefined credentials; and automatically inviting, via a second instant message sent by the computing system and consequent to the determining that the condition is satisfied, a backup invitee to participate in the IM collaboration.

Advantageously, the present invention provides a technique for using business rules to control invitations to join instant message collaborations. Further, the present invention provides an iterative process of applying business rules to primary invitees and a series of backup invitees that facilitates the resolution of crisis situations by, for example, alerting a person who is available to respond and restore a vital computer-based service that is inoperative. Still further, the iterative process can incorporate an escalation process in which business rules direct requests to a hierarchy of escalation persons (e.g., manager, regional manager, etc.) if the person who is initially designated to receive the request is unavailable. Additional advantages provided by the present invention include: (1) eliminating the need to publish backup schedules for people who are on rotational coverage because the backup coverage information is included within the business rules; (2) for call centers that allow users to initiate a chat message collaboration, enabling agents for the call center to work from a single public IM ID; and (3) using the business rules to allow a pool of resources (e.g., administrative assistants) to be grouped together.

BRIEF DESCRIPTION OF THE DRAWINGS

FIG. 7 is a table of exemplary business rules stored in a database by the process of FIG. 2, in accordance with embodiments of the present invention.

FIG. 8 is a table of exemplary business rules that direct instant message collaboration invitations to backup invitees in the processes of FIGS. 3 and 5A-5B, where directing the invitations is based on the invitations' subject matter, in accordance with embodiments of the present invention.

FIG. 9 is a table of exemplary business rules that direct instant message collaboration invitations to backup invitees in the processes of FIGS. 3 and 5A-5B, where directing the invitations is based on the invitations' requesters, in accordance with embodiments of the present invention.

DETAILED DESCRIPTION OF THE INVENTION

The present invention imposes business rules onto an instant message (IM) collaboration to control invitations to join the collaboration. The invitees to the IM collaboration may be dynamically altered in accordance with business objectives (i.e., a business policy) predefined by one or more business rules. Examples of such dynamic alteration of collaboration invitees include inviting a backup to a primary invitee (1) if the primary invitee does not join the IM collaboration in a predefined amount of time following an invitation, (2) if the timing of the invitation is not within the primary invitee's predefined working period, or (3) if the credentials of the primary invitee are not included in a set of predefined credentials required for participation in the collaboration.

As used herein, a business rule is defined as an expression of desired operational attributes of a system for controlling invitations to join an IM collaboration. Examples of such desired operational attributes include (1) a valid invitation time period for an invitee, (2) a set of credentials required for participation in the IM collaboration, (3) a maximum amount of time the system waits for an invitee to respond to an invitation before inviting the invitee's backup, (4) an identification of a backup invitee to a primary invitee, and (5) conditions under which an entity is notified of the invocation of a business rule.

System Overview

Figure 1:
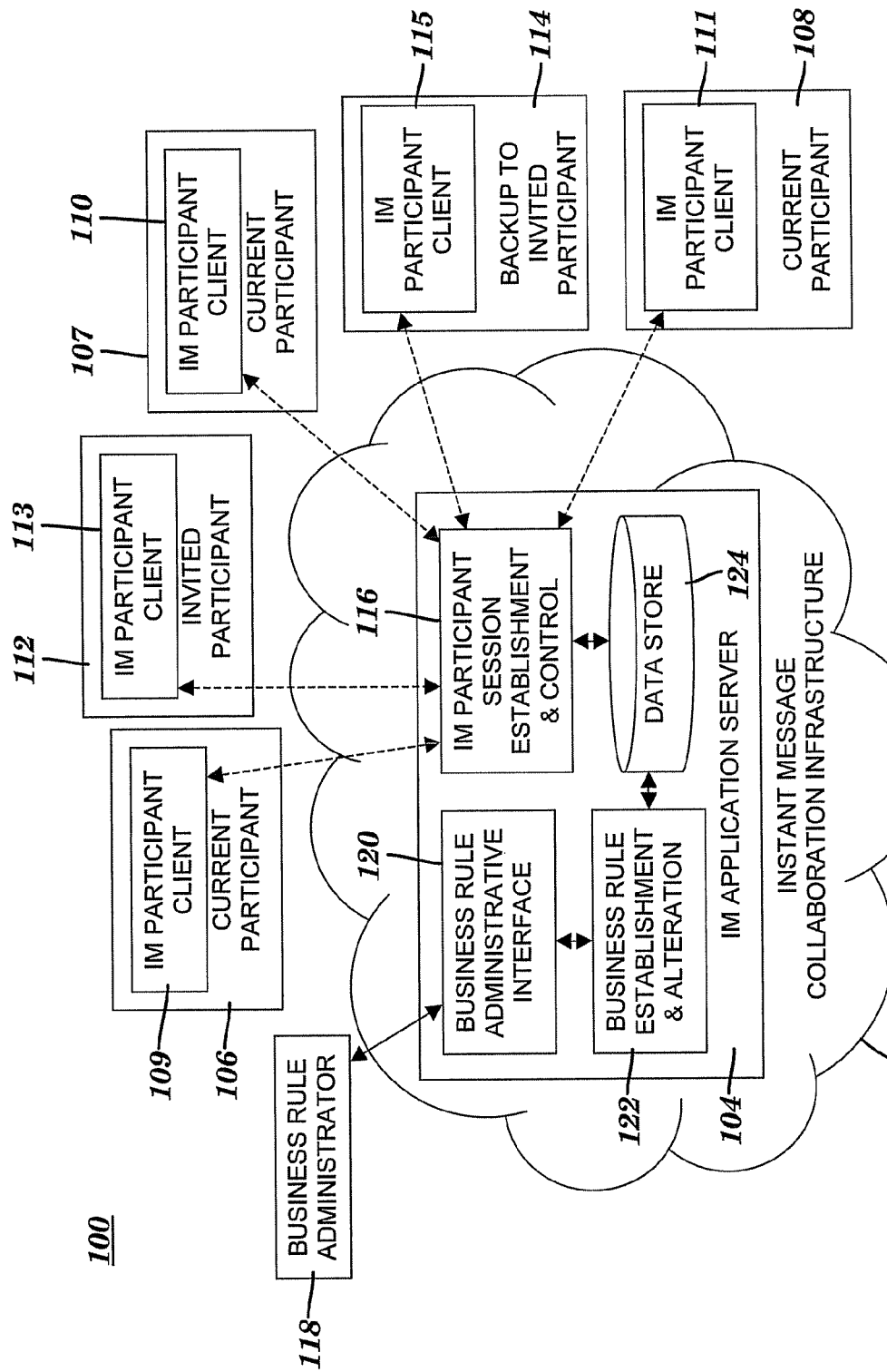
FIG. 1 is a block diagram of a system for using business rules to control invitations to join instant message collaborations, in accordance with embodiments of the present invention.

FIG. 1 is a block diagram of a system for using business rules to control invitations to join instant message collaborations, in accordance with embodiments of the present invention. System 100 includes an instant message (IM) collaboration infrastructure 102 that includes an IM application server 104 that controls an IM collaboration and establishes business rules used to control the IM collaboration. IM application server 104 can be included in a single computing unit or distributed over multiple computing units. The IM collaboration includes current participant computing units 106, 107 and 108, which include IM participant clients 109, 110 and 111, respectively. System 100 also includes a computing unit 112 of an invitee (a.k.a. invited participant). Computing unit 112 includes an IM participant client 113. Further, system 100 includes a computing unit 114 of a backup to the aforementioned invited participant. Computing unit 114 includes an IM participant client 115.

IM application server 104 includes an IM participant session establishment and control engine 116 that establishes and controls an IM collaboration session that includes the aforementioned current participants and is capable of including the invited participant or the backup of the invited participant. Engine 116 communicates with IM participant clients 109-111, 113 and 115 via a network (e.g., Internet or intranet).

A business rule administrator 118 provides business rules or updated business rules via a business rule administrative interface 120 to a business rule establishment and alteration engine 122 included in IM application server 124. The business rules provided by business rule administrator 118 are stored in data store 124 by business rule establishment and alteration engine 122. The business rules stored in data store 124 are accessible by IM participant session establishment and control engine 116 for controlling the IM collaboration session.

The present invention's application of business rules within a real-time collaboration system supports a business quality collaboration service that is provided by an internet service provider such as AOL® or provided as a business service from a service provider such as International Business Machines Corporation of Armonk, N.Y. In one embodiment, system 100 is incorporated into instant message environments such as Lotus® Sametime® offered by International Business Machines Corporation or AOL Instant Messenger® offered by AOL® LLC of Dulles, Va.

In one embodiment, system 100 is modified to accommodate the initiation of an IM collaboration session. In other words, the present invention also contemplates a system that includes a plurality of computing units of invited participants and backups to the invited participants at a time when the IM collaboration is in its initial stages and there are no current participants yet.

Preparation Phase

Figure 2:
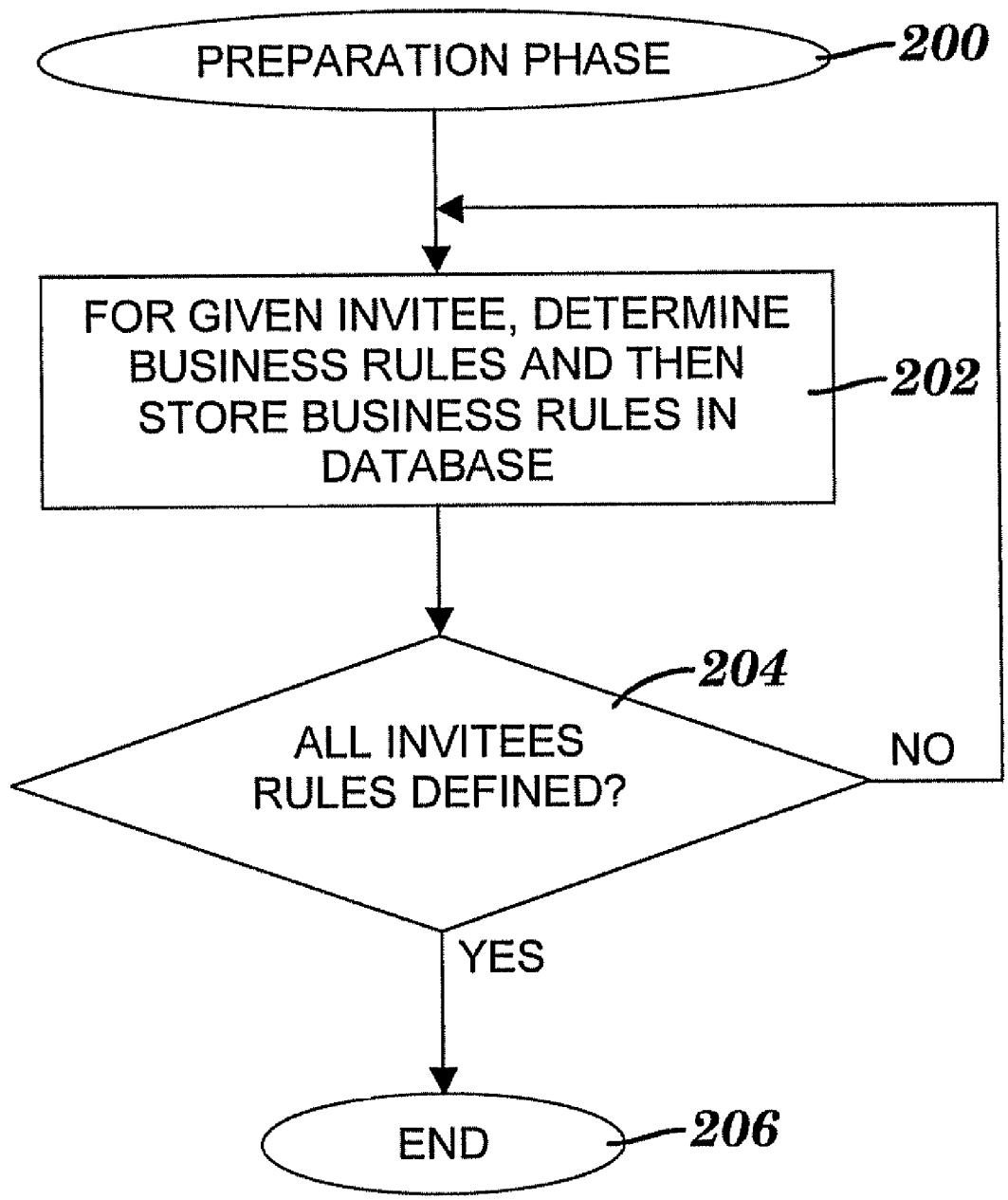
FIG. 2 is a flow diagram of a preparation process of using business rules to control invitations to join instant message collaborations in the system of FIG. 1, in accordance with embodiments of the present invention.

FIG. 2 is a flow diagram of a preparation process (a.k.a. preparation phase) of using business rules to control invitations to join instant message collaborations in the system of FIG. 1, in accordance with embodiments of the present invention. The preparation process establishes the business rules and starts at step 200. In step 202, for a given invitee of an IM collaboration, business rule administrator 118 (see FIG. 1) defines one or more business rules and provides the one or more business rules to business rule establishment and alteration engine 122 (see FIG. 1) via interface 120 (see FIG. 1). Business rule establishment and alteration engine 122 (see FIG. 1) stores the one or more business rules defined in step 202 in data store 124 (see FIG. 1) (e.g., a database structure). If IM application server 104 (see FIG. 1) determines in inquiry step 204 that business rules for all invitees to the IM collaboration have been defined, then the preparation process of FIG. 2 ends at step 206. Otherwise, a next invitee that is associated with one or more business rules that need to be defined is identified by IM application server 104 (see FIG. 1) and the process loops back to step 202.

In another embodiment, instead of business rule administrator 118 (see FIG. 1) acting at step 202, an invitee to the IM collaboration defines one or more business rules associated with the invitee, and the invitee provides the one or more business rules to business rule establishment and alteration engine 122 (see FIG. 1).

Operational Phase

Figure 3:
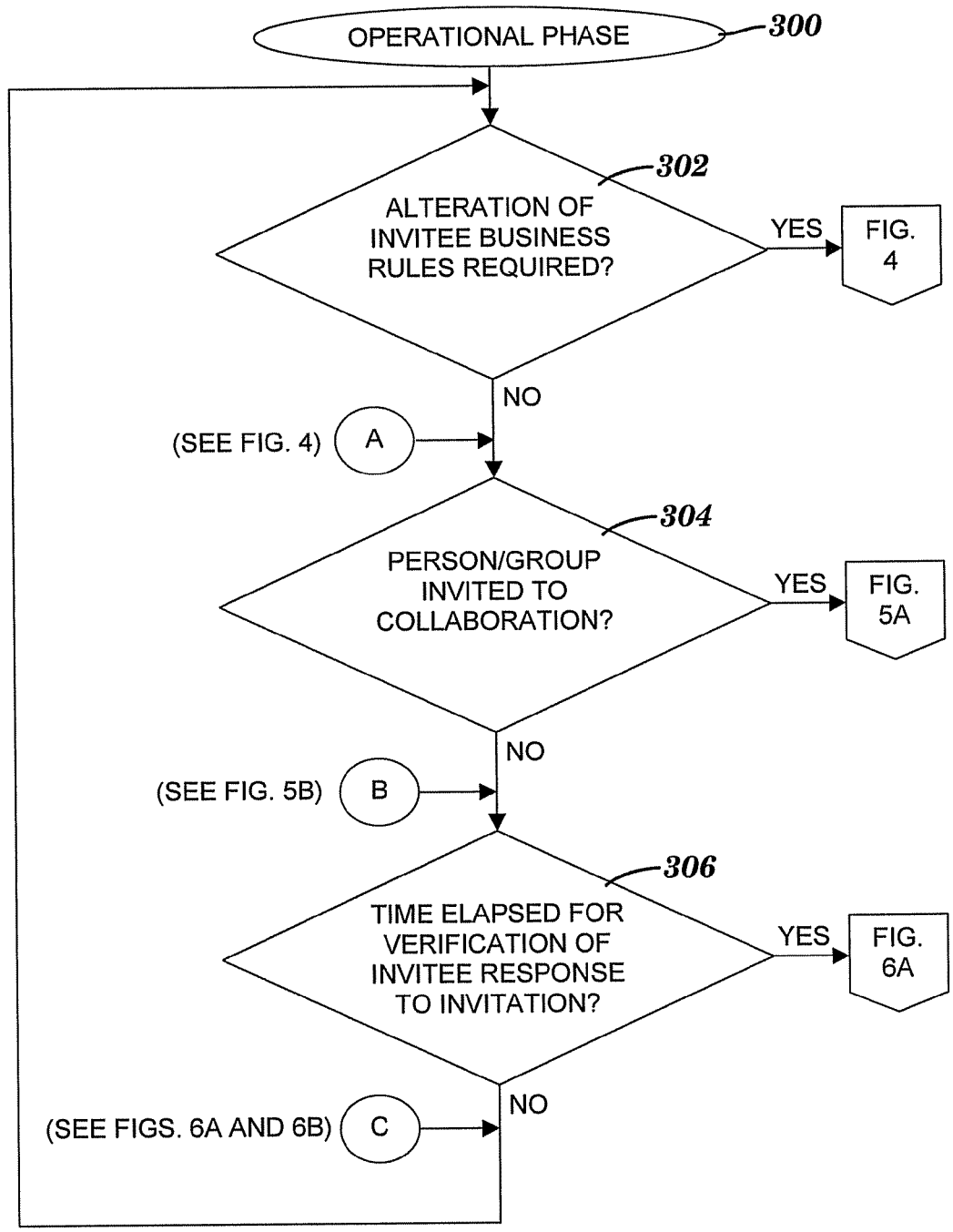
FIG. 3 is a flow diagram of an operational process for using business rules to control invitations to join instant message collaborations in the system of FIG. 1, in accordance with embodiments of the present invention.

FIG. 3 is a flow diagram of an operational process (a.k.a. operational phase or enforcement phase) for using business rules to control invitations to join instant message collaborations in the system of FIG. 1, in accordance with embodiments of the present invention. The operational process starts at step 300. If business rule establishment and alteration engine 122 (see FIG. 1) determines in inquiry step 302 that an alteration of invitee business rules is required, then the process continues with the alteration process of FIG. 4. If inquiry step 302 determines that no alteration of invitee business rules is required, then the operational process continues with inquiry step 304.

Figure 5A:
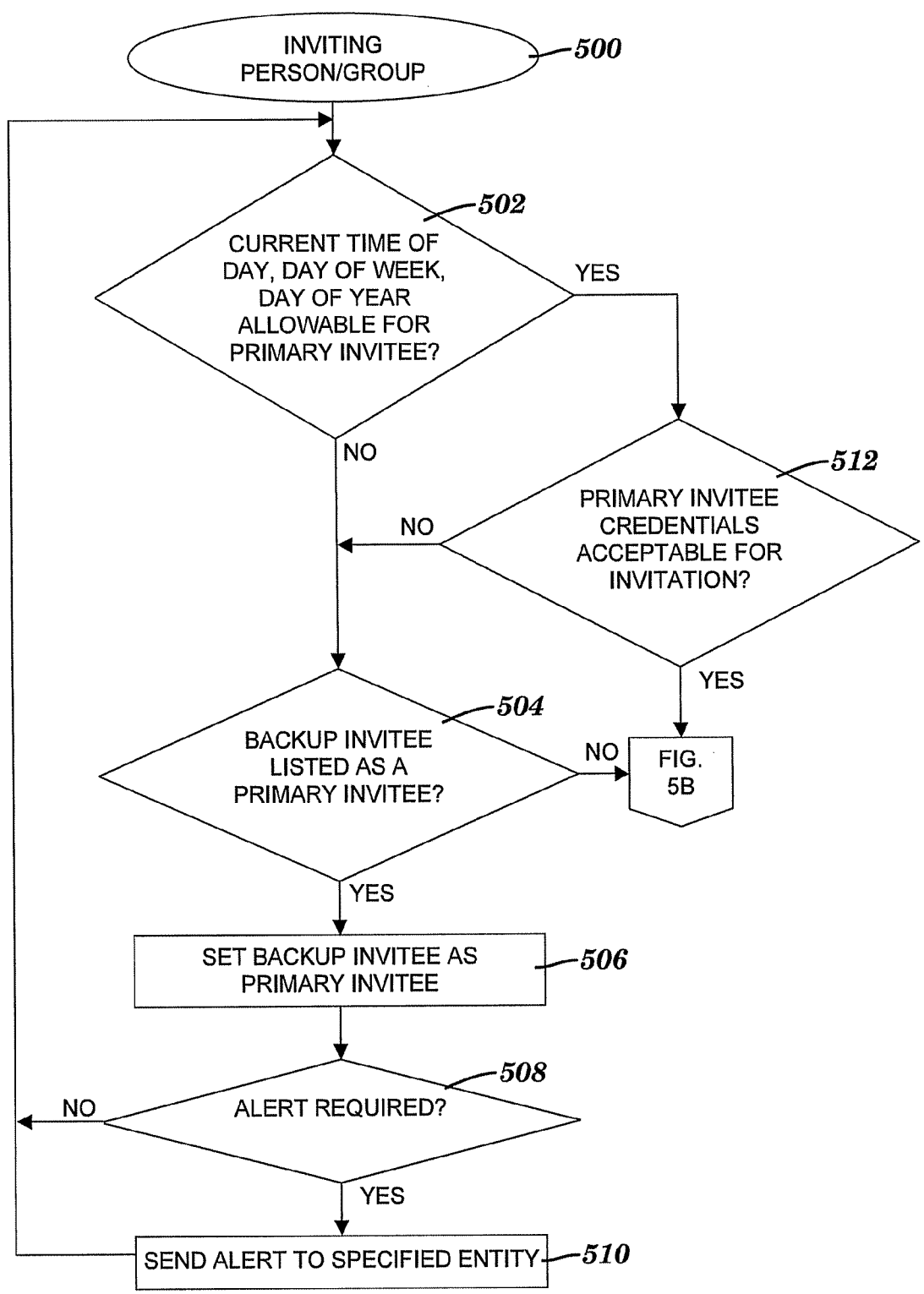
FIGS. 5A-5B depict a flow diagram of a process of inviting instant message collaboration invitees within the process of FIG. 3, in accordance with embodiments of the present invention.
Figure 5B:
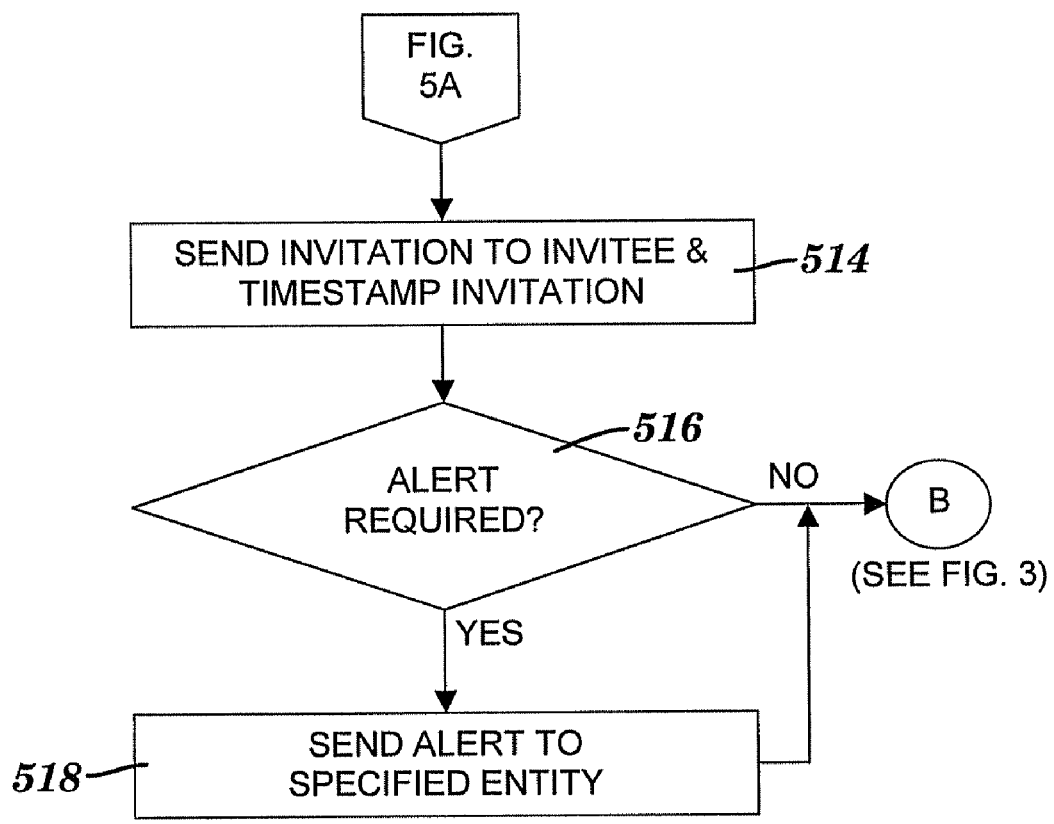

If IM participant session establishment and control engine 116 (see FIG. 1) determines in inquiry step 304 that an entity (e.g., person or group of people) is to be invited to the IM collaboration, then the process continues with the participant invitation process of FIG. 5A; otherwise, the operational process continues with inquiry step 306. The entity determined to be invited to the IM collaboration in step 304 is also referred to herein as a primary invitee. If the entity in step 304 is a group of people, then the present invention treats the group of people to be invited as if it were a single person (i.e., the group has the characteristics of a single person and the steps of the subsequent invitation process of FIGS. 5A-5B are the same irrespective of whether the invitee is a single person or a group of people). The process of FIG. 5A includes steps that enforce one or more business rules within an IM collaboration.

Figure 6A:
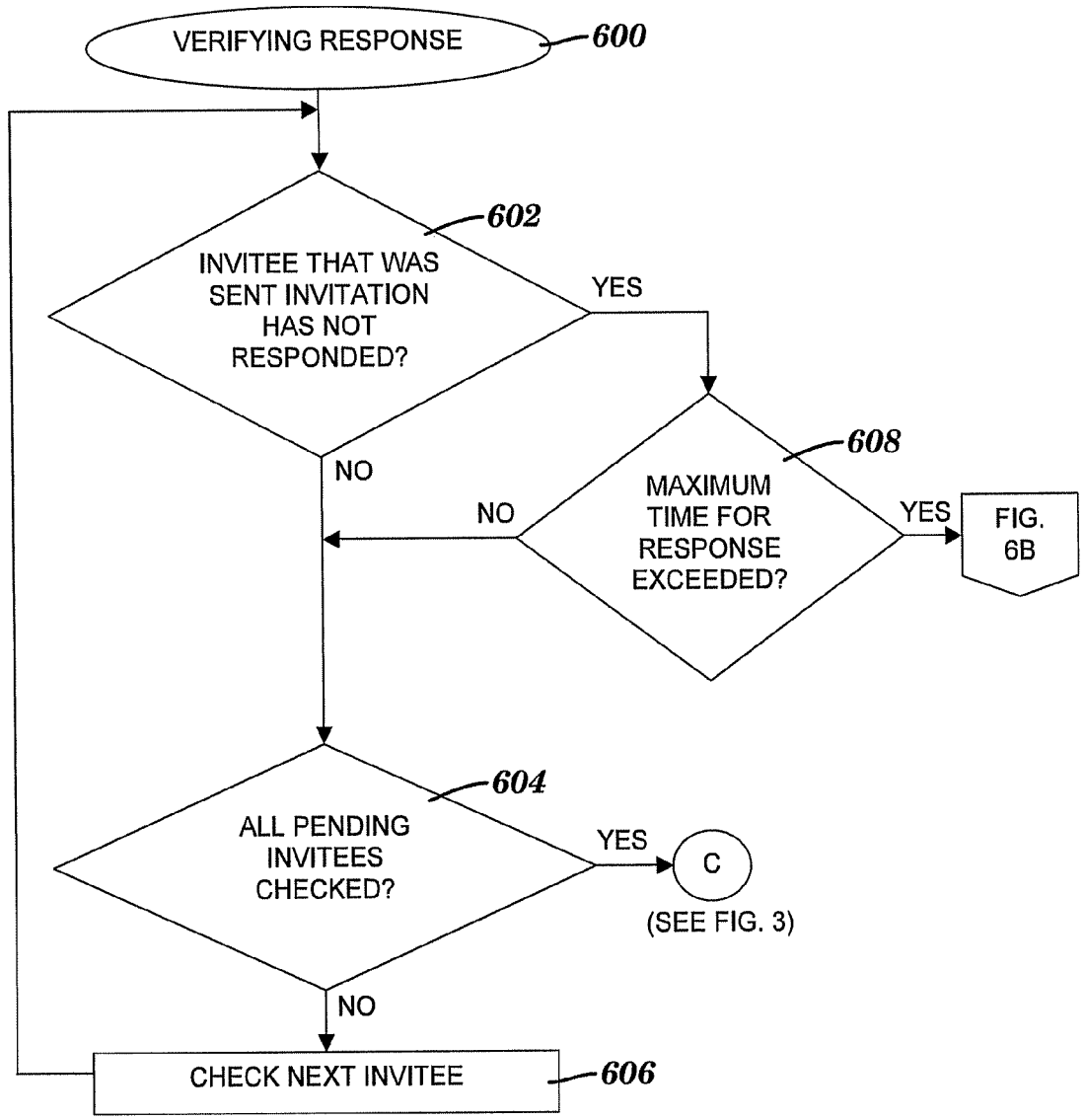
FIGS. 6A-6B depict a flow diagram of a process of verifying responses from instant message collaboration invitees within the process of FIG. 3, in accordance with embodiments of the present invention.

If IM participant session establishment and control engine 116 (see FIG. 1) determines in inquiry step 306 that a predetermined time period for verification of an invitee's response to an invitation to the IM collaboration has elapsed, then the process continues with the response verification process of FIG. 6A; otherwise the operational process continues by looping back to inquiry step 302. The process of FIG. 6A includes steps that enforce one or more business rules within an IM collaboration.

Altering Business Rules

Figure 4:
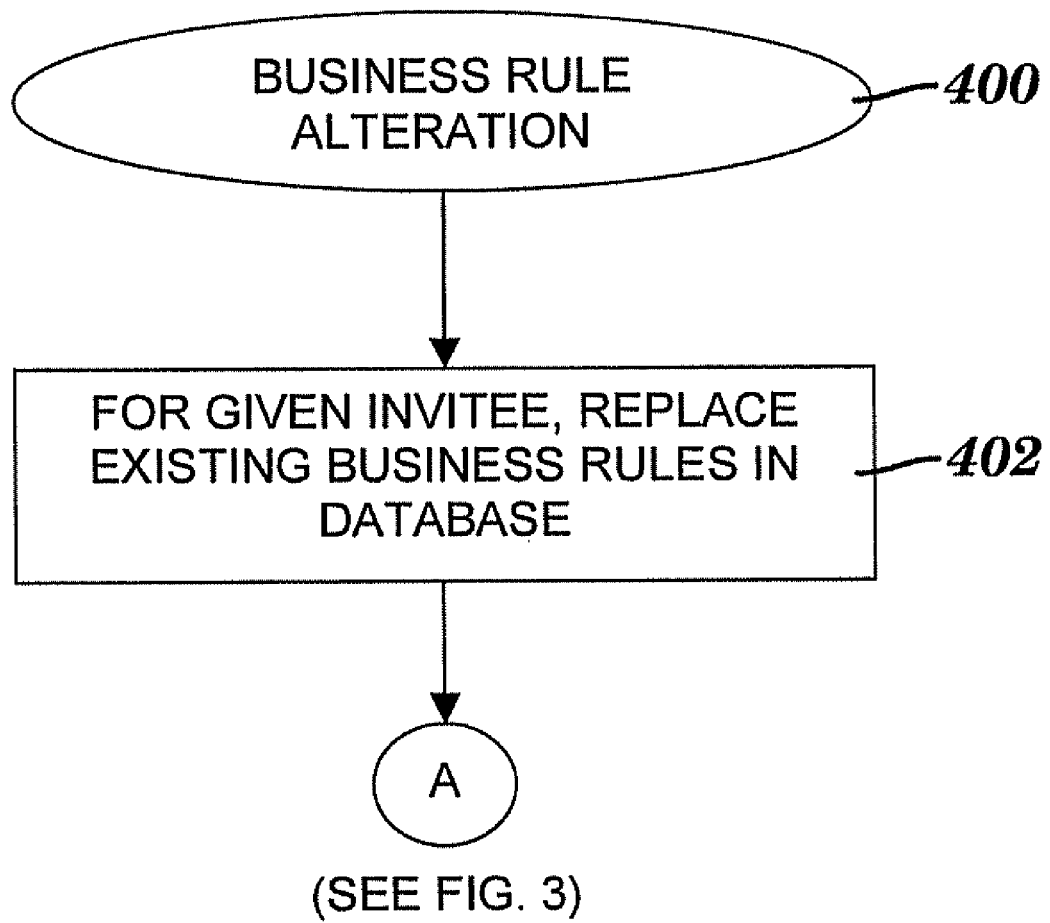
FIG. 4 is a flow diagram of a process of altering a business rule within the process of FIG. 3, in accordance with embodiments of the present invention.

FIG. 4 is a flow diagram of a process of altering a business rule within the process of FIG. 3, in accordance with embodiments of the present invention. The business rule alteration process begins at step 400, which follows the Yes branch of inquiry step 302 (see FIG. 3). In step 402, for a given invitee to the IM collaboration, business rule establishment and alteration engine 122 (see FIG. 1) deletes or adds one or more business rules in data store 124 (see FIG. 1) or replaces one or more existing business rules in data store 124 (see FIG. 1) with one or more updated business rules. In one embodiment, business rule administrator 118 (see FIG. 1) provides the one or more updated business rules and/or instructions to delete or add one or more business rules to business rule establishment and alteration engine 122 (see FIG. 1) via business rule administrative interface 120 (see FIG. 1). In another embodiment, an invitee to the IM collaboration updates a business rule associated with the invitee and provides the updated business rule to business rule establishment and alteration engine 122 (see FIG. 1).

Inviting Collaboration Participants

FIGS. 5A-5B depict a flow diagram of a process of inviting instant message collaboration invitees within the process of FIG. 3, in accordance with embodiments of the present invention. The participant invitation process starts at step 500, which follows the Yes branch of inquiry step 304 (see FIG. 3). Each of the subsequent steps of the participant invitation process of FIGS. 5A-5B is performed by IM participant session establishment and control engine 116 (see FIG. 1).

If inquiry step 502 determines that a time of an IM collaboration invitation to a primary invitee is not valid, then a backup invitee is identified and the participant invitation process continues with inquiry step 504. A primary invitee is the entity The invitation time in step 502 is validated by comparing the current time, day, date, etc. with a valid invitation time period specified in a business rule associated with the primary invitee. The valid invitation time period in the business rule specifies, for example, the times of the day (e.g., regular working hours of the primary invitee), days of the week, and/or days of the year during which the primary invitee is allowed to receive an invitation to an IM collaboration. If the current time, day, date, etc. is included in or specified by the business rule's valid invitation time period, then the Yes branch of step 502 is followed by the participant invitation process.

As one example, if the current time is 09:00 U.S. Eastern Time and a business rule associated with a primary invitee includes a valid invitation time that specifies that the primary invitee is allowed to receive invitations to join IM collaborations between 08:00 and 16:00 U.S. Eastern Time, then the current time is allowable for an IM collaboration invitation to the primary invitee (i.e., 09:00 is within the valid invitation time period of 08:00 to 16:00) and the participant invitation process of FIG. 5A uses the Yes branch of step 502.

As another example, if the current time is 07:00 U.S. Eastern Time and a business rule associated with a primary invitee specifies that the primary invitee is allowed to receive invitations to join IM collaborations between 08:00 and 16:00 U.S. Eastern Time, then the current time is not allowable for an IM collaboration invitation to the primary invitee (i.e., 07:00 is not within the valid invitation time period of 08:00 to 16:00) and the participant invitation process of FIG. 5A uses the No branch of step 502.

Inquiry step 504 follows a finding in step 502 that the timing of the collaboration invitation does not satisfy the valid invitation time of the business rule associated with the primary invitee. If inquiry step 504 determines that the backup invitee is listed as a primary invitee in another business rule stored in data store 124 (see FIG. 1), then in step 506, for this instance of collaboration, the backup invitee is set as the primary invitee (i.e., the backup invitee is set as a new primary invitee). If inquiry step 508 determines that an alert to a specified entity is required, then the alert is sent to the specified entity in step 510. The alert sent in step 510 describes one or more actions associated with the primary invitee that are taken in response to an invocation (i.e., application) of a business rule in step 502, 504 and/or 512 that results in the backup invitee being set as the primary invitee in step 506. For example, an action described in an alert is that the backup invitee of steps 504 and 506 is being invited as a substitute for the primary invitee. The determination made in step 508 is based on one or more alert conditionals included in the business rule associated with the primary invitee. Alert conditionals are described below relative to FIG. 7.

Following step 510 or if inquiry step 508 determines that no alert is required, the process loops back to inquiry step 502, which determines the validity of the invitation time for the new primary invitee set in step 506.

Returning to step 502, if the IM collaboration invitation time is valid according to the business rule associated with the primary invitee, the process continues with inquiry step 512. If inquiry step 512 determines that one or more credentials of the primary invitee are not acceptable according to a set of predetermined credentials associated with the invitation and which are required for allowing the primary invitee to participate in the collaboration, then the process continues with inquiry step 504; otherwise the invitation process of FIGS. 5A-5B verifies that the primary invitee satisfies the associated business rule and the process continues with step 514 in FIG. 5B. The one or more credentials utilized in step 512 are specified by the business rule associated with the primary invitee. The process of FIGS. 5A-5B also continues with step 514 of FIG. 5B if inquiry step 504 determines that the backup invitee is not listed as a primary invitee in another business rule. That is, the backup invitee has no associated business rule with a valid invitation time period and therefore, the backup invitee is allowed to be contacted at any time.

In step 514 of FIG. 5B, IM participant session establishment and control engine 116 (see FIG. 1) sends an IM collaboration invitation to the primary invitee and records a timestamp of the invitation in data store 124 (see FIG. 1). If inquiry step 516 determines that an alert to a specified entity is required, then IM application server 104 (see FIG. 1) sends the alert to the specified entity in step 518. Following step 518, or if inquiry step 516 determines that no alert is required, the process continues with step 306 of FIG. 3. The determination made in step 516 is based on alert conditionals included in the business rule associated with the primary invitee.

The aforementioned loop back to step 502 after step 510 or via the No branch of step 508 provides for an iterative application of business rules described above in steps 502, 504, 508 and/or 512. For instance, the invitation process of FIGS. 5A-5B applied to a backup invitee of a primary invitee follows the same steps that had been applied to the initial primary invitee if the backup invitee is also listed as a primary invitee in a business rule (i.e., as determined by step 504). Further iterations of those same steps (i.e., the steps applied to the initial primary invitee) can be applied to a backup of the backup invitee, a backup to the backup of the backup invitee, etc., as long as the backup in each iteration is listed as a primary invitee in a business rule.

Verifying Responses

Figure 6B:
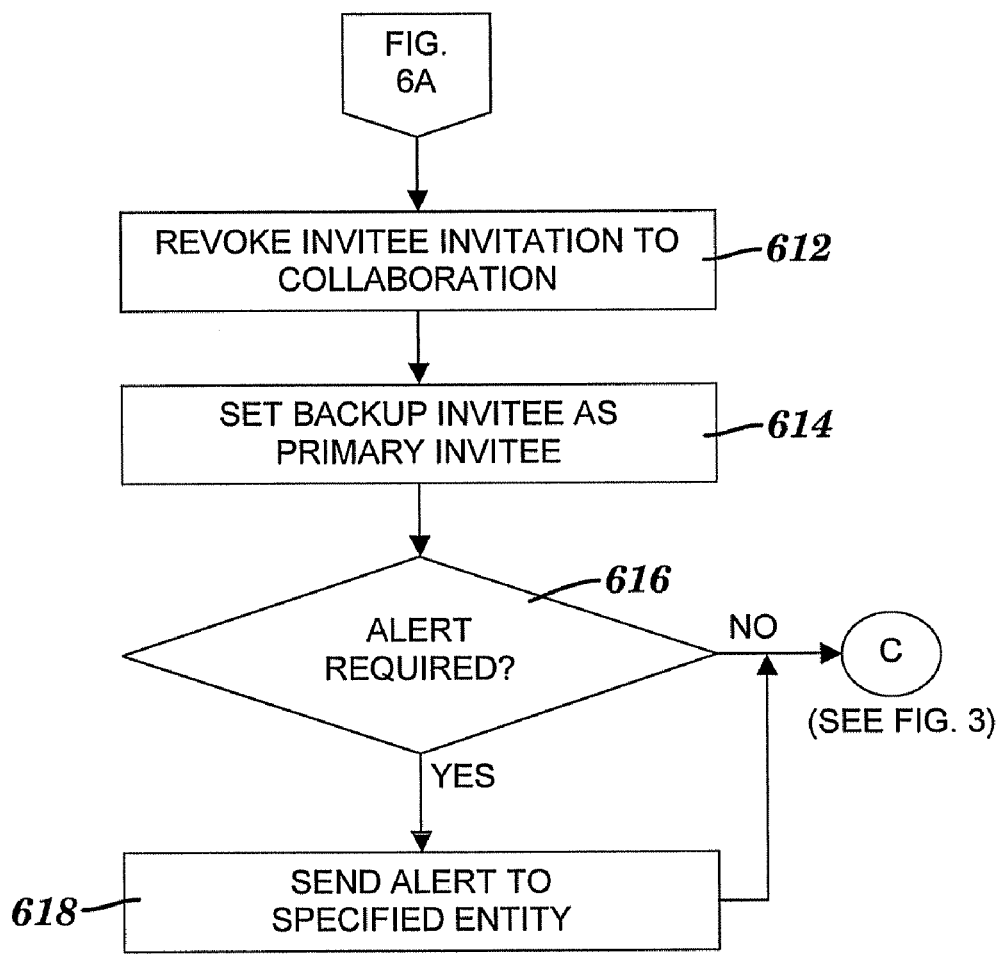

FIGS. 6A-6B depict a flow diagram of a process of verifying responses from instant message collaboration invitees within the process of FIG. 3, in accordance with embodiments of the present invention. The response verification process starts at step 600, which follows the Yes branch of inquiry step 306 (see FIG. 3). Each of the subsequent steps of the response verification process of FIGS. 6A-6B is performed by IM participant session establishment and control engine 116 (see FIG. 1).

If inquiry step 602 determines that the invitee that was sent an invitation to an IM collaboration has responded to the invitation, then the process continues with step 604. If inquiry step 604 determines that all pending invitees have been checked for their responses to their respective invitations, then the process continues with step 302 of FIG. 3; otherwise the next invitee is identified and the response checking procedure for the next invitee is initiated in step 606. Following step 606, the response verification process loops back to step 602.

If inquiry step 602 determines that the invitee has not responded to the invitation to the IM collaboration, then step 608 determines if a predetermined maximum time to wait for the invitee's response to the invitation has been exceeded. That is, step 608 checks whether a predefined maximum wait time specified by the business rule associated with the invitee has been exceeded. The predefined maximum wait time is a predefined duration during which the IM collaboration invitation is allowed to be active but not responded to by the invitee. In one embodiment, the business rule applied in step 608 is the same business rule applied in steps 502, 504, 508 and 512 of FIG. 5A. If step 608 determines that the maximum wait time for the primary invitee's response has not been exceeded, then the process continues with step 604; otherwise, the process continues with step 612 of FIG. 6B.

In step 612 of FIG. 6B, the invitee's invitation to the IM collaboration is revoked. That is, IM participant session establishment and control engine 116 (see FIG. 1) does not recognize any response sent by the primary invitee after the maximum wait time has been exceeded. In step 614, the backup invitee is set as the primary invitee. If inquiry step 616 determines that an alert to a specified entity is required, then in step 618, the alert is sent to the specified entity. One or more alert conditions included in the business rule applied in step 608 are used to make the determination in step 616. The business rule applied in step 608 also specifies the entity that is to receive the alert. Following step 618, or if inquiry step 616 determines that no alert is required, the process continues with step 302 of FIG. 3.

Database for Storing Business Rules

FIG. 7 is a table 700 of exemplary business rules stored in a database by the process of FIG. 2, in accordance with embodiments of the present invention. Each business rule in table 700 is associated with a single primary invitee. In one embodiment, the database structure (e.g., table 700) storing the business rules of the present invention is included in data store 124 (see FIG. 1) and includes at least the following fields:

Primary Invitee: Identity of the person or group desired to be invited to an IM collaboration.

Valid Invite Time: Time of day, month, year, day of week, etc. that an invitee is allowed to be invited to an IM collaboration.

Invitee Credentials: Identifies one or more attributes (e.g., citizenship or skills) that are exhibited by the primary invitee and that are compared to a predefined set of one or more credentials. The one or more credentials in the predefined set are the credentials an invitee is required to have before an invitation to join an IM collaboration is allowed to be sent to the invitee. If the aforementioned comparison determines that the predefined set of one or more credentials are included in the one or more attributes in the Invitee Credentials field, then the IM participant session establishment and control engine 116 (see FIG. 1) vets the invitee and allows the invitee to receive the IM collaboration invitation and to participate in the IM collaboration. The predefined set of one or more credentials is included in a set of attributes associated with an invitation to join an IM collaboration.

Credential Authority: Identifies the authoritative source for verification of the corresponding credential listed in the Invitee Credentials field.

Wait Time: Duration that the invitation to the invitee is allowed to remain active without being responded to by the invitee, after which the invitation is revoked and the invitee's backup invitee is invited to join the IM collaboration.

Backup Invitee: Identity of the person or group designated to be invited if the primary invitee cannot join the IM collaboration according to a business rule or does not join the IM collaboration within the corresponding time in the Wait Time field. In an alternate embodiment, a business rule does not include a backup invitee field, but includes an alert receiver that receives an alert message that indicates that a primary invitee is unavailable to participate in an IM collaboration or unable to participate in the IM collaboration due to the timing of the invitation or the primary invitee' lack of required credentials.

Alert Conditional: One or more conditions that cause an alert to be sent. For example, a "no response" alert conditional specifies that an alert is to be sent if the primary invitee does not respond to the invitation within the wait time. Further, a "revocation" alert conditional specifies that an alert is to be sent if the IM collaboration invitation is revoked. Still further, a "substitution" alert conditional indicates that an alert is to be sent if the backup invitee has been set as the primary invitee.

Alert Receiver: Identity of the entity that receives an alert sent as a result of the corresponding condition in the Alert Conditional field. As used herein, an alert is defined as an informational message which describes one or more actions of an IM collaboration system (e.g., system 100 of FIG. 1), such as invocations of business rules. In one embodiment, the identity of the alert receiver may be a logical address (e.g., an IP address) or a name (e.g., alerts.ibm.com).

In a first example that applies a business rule specified by the first data row of table 700 (i.e., the John Doe business rule), an invitation to join an IM collaboration is to be sent to John Doe at 17:00 Eastern Time (et). Since the time of 17:00et is outside John Doe's valid invitation time period of 8:00-16:00et, weekdays, except holidays (see the Valid Invite Time column in the John Doe business rule), the application of the business rule causes the process of FIGS. 5A-5B to use the No branch of step 502 (see FIG. 5A). The backup invitee (i.e., Howard Smith in the Backup Invitee column of the John Doe business rule) is not listed as a primary invitee in any of the other business rules in table 700 and therefore, the No branch of step 504 (see FIG. 5A) is followed by the invitation process of FIG. 5A. An invitation is then sent to Howard Smith and a timestamp of the invitation is recorded in step 514 of FIG. 5B.

In a second example that applies a business rule specified by the second data row of table 700 (i.e., the 1st Shift Help Desk business rule), an invitation to join an IM collaboration is to be sent to the 1st Shift Help Desk at 17:00et. Since 17:00et is not within the Valid Invite Time of the 1st Shift Help Desk business rule (i.e., between 8:00-16:00et weekdays, except holidays), the invitation process proceeds over the No branch of step 502 (see FIG. 5A). The Yes branch of step 504 (see FIG. 5A) is then followed by the invitation process because the backup invitee (i.e., Backup Help Desk in the Backup Invitee column of the 1st Shift Help Desk business rule) is also listed as a primary invitee in the fifth data row of table 700. The Backup Help Desk is then set as the primary invitee (see step 506 of FIG. 5A). For this example, no alert is required, and therefore the No branch of step 508 (see FIG. 5A) is followed by the invitation process. The logic of the invitation process then loops back to step 502, thereby repeating the business rule application steps, but with the Backup Help Desk business rule (i.e., the fifth data row of table 700) and the former backup invitee (i.e., the Backup Help Desk) as the primary invitee. With the Backup Help Desk as the primary invitee, the invitation time of 17:00et is allowable in step 502 (see FIG. 5A) because the Valid Invite Time for the Backup Help Desk indicates that all times are allowable. In this example, the credentials of the Backup Help Desk are acceptable for the invitation and therefore the Yes branch of step 512 (see FIG. 5A) is followed by the invitation process. The invitation is then sent to the Backup Help Desk in step 514 (see FIG. 5B) and no alert is required in step 516 (see FIG. 5B).

In a third example that applies a business rule specified by the second data row of table 700 (i.e., the 1st Shift Help Desk business rule), an invitation to join an IM collaboration is to be sent to the 1st Shift Help Desk at 9:00et and the invitation does not specify any required credentials. Therefore, step 502 (see FIG. 5A) allows the current time of day (i.e., 9:00et is within the Valid Invite Time of 08:00-16:00et for the 1st Shift Help Desk business rule) and determines that the 1st Shift Help Desk's credentials are acceptable in step 512 (see FIG. 5A). An invitation is then sent to the 1st Shift Help Desk and a timestamp of the invitation is recorded in step 514 (see FIG. 5B). In this example, no alert is required in step 516 (see FIG. 5B). The 1st Shift Help Desk does not respond to the invitation within the maximum wait time (i.e., within one minute) specified by the Wait Time column of the 1st Shift Help Desk business rule. Thus, the Yes branches of steps 306 (see FIG. 3) 602 (see FIG. 6A) and 608 (see FIG. 6A) are followed by the processes of FIGS. 3 and 6A. The invitation to the 1st Shift Help Desk is then revoked in step 612 (see FIG. 6B) and the backup invitee (i.e., Backup Help Desk) listed in the Backup Invitee column of the 1st Shift Help Desk business rule of table 700 is set as the new primary invitee. The Alert Conditional (i.e., no response) for the 1st Shift Help Desk business rule indicates that an alert is required in this case (i.e., the 1st Shift Help Desk did not respond within the wait time period). Therefore, the Yes branch of step 616 (see FIG. 6B) is followed by the response verification process and in step 618 (see FIG. 6B) an alert is sent to the alert receiver (i.e., Help Desk Mgt) listed in the Alert Receiver column of the 1st Shift Help Desk business rule. In this example, no further alteration of business rules are required in step 302 (see FIG. 3), and the invitation process of FIGS. 5A-5B is repeated for the new primary invitee (i.e., Backup Help Desk), using the fifth data row of table 700 (i.e., the Backup Help Desk business rule). In step 502 (see FIG. 5A), the invitation time is allowable because the Valid Invite Time for the Backup Help Desk business rule indicates that all times are allowable. Step 512 (see FIG. 5A) then determines that the credentials of the Backup Help Desk are acceptable for the invitation, and the invitation is sent to the Backup Help Desk in step 514 (see FIG. 5B).

In a fourth example that applies a business rule specified by the second data row of table 700 (i.e., the 1st Shift Help Desk business rule), an invitation to join an IM collaboration is to be sent to the 1st Shift Help Desk at 9:00et. The invitation is associated with a set of required credentials that allow only participants that possess Certificate-123445 or Certificate-123446. Again, 9:00et is allowable according to the Valid Invite Time for the 1st Shift Help Desk business rule, and therefore the Yes branch of step 502 (see FIG. 5A) is followed by the invitation process. Step 512 (see FIG. 5A), however, determines that the credentials possessed by the 1st Shift Help Desk (i.e., Certificate-123456, which is specified in the Invitee Credentials column of the 1st Shift Help Desk business rule of FIG. 7) are not included in the set of required credentials associated with the invitation. That is, Certificate-123456 possessed by the 1st Shift Help Desk does not match the required credentials of the invitation (i.e., Certificate-123445 or Certificate-123446). Thus, the No branch of step 512 is followed by the invitation process and the example proceeds with determining in step 504 (see FIG. 5A) that the backup invitee (i.e., Backup Help Desk) is listed as a primary invitee in the fifth data row of table 700 (i.e., the Backup Help Desk business rule). The Backup Help Desk is then set as the primary invitee (see step 506 of FIG. 5A). For this example, no alert is required, and therefore the No branch of step 508 (see FIG. 5A) is followed by the invitation process. The logic of the invitation process then loops back to step 502, thereby repeating the business rule application steps, but with the Backup Help Desk business rule and the former backup invitee (i.e., the Backup Help Desk) as the primary invitee. With the Backup Help Desk as the primary invitee, the invitation time of 9:00et is allowable in step 502 (see FIG. 5A) because the Valid Invite Time for the Backup Help Desk indicates that all times are allowable. The credentials of the Backup Help Desk (i.e., Certificate-123445) match one of the required credentials of the invitation (i.e., Certificate-123445 or Certificate-123446), are therefore acceptable for the invitation, and the Yes branch of step 512 (see FIG. 5A) is followed by the invitation process. The invitation is then sent to the Backup Help Desk in step 514 (see FIG. 5B) and no alert is required in step 516 (see FIG. 5B).

It should be understood that table 700 is only an example of the database structure used in data store 124 (see FIG. 1). For instance, if multiple invitee credentials are expressed for one primary invitee, the credentials may be expressed in one entry in the database table or in separate entries.

Context-Sensitive Text Examples

FIG. 8 is a table of exemplary business rules that direct instant message collaboration invitations to backup invitees in the processes of FIGS. 3 and 5A-5B, where directing the invitations is based on the invitations' subject matter, in accordance with embodiments of the present invention. Table 800 includes business rules that have an IM Phrase column. The entity listed in the Backup Invitee column is specified as the backup invitee if the instant message that invites James Smith (i.e., the primary invitee) to the IM collaboration includes the one or more phrases included in the corresponding entry in the IM Phrase column. For instance, if the instant message that invites James Smith includes the phrases "urgent case" or "case 8400" (i.e., the IM phrase entry in the first data row of table 800), then the backup invitee is specified as Mary Rogers (i.e., the Backup Invitee entry in the first data row of table 800). In a similar example referencing the second data row of table 800, if the instant message invitation includes the phrase "case 8432" or "case 8444", then the backup invitee is specified as Jane Williams.

FIG. 9 is a table of exemplary business rules that direct instant message collaboration invitations to backup invitees in the processes of FIGS. 3 and 5A-5B, where directing the invitations is based on the invitations' requesters, in accordance with embodiments of the present invention. Table 900 includes business rules that have an Identity of Requestor column. The entity listed in the Backup Invitee column is specified as the backup invitee if the requestor that initiates the instant message that invites James Smith (i.e., the primary invitee) to the IM collaboration is the entity listed in the corresponding Identity of Requestor column. For instance, if the requester of the instant message invitation is SM Boss (i.e., the entry in the Identity of Requestor column in the first data row of table 900), then the backup invitee is John Williams (i.e., the entry in the Backup Invitee column in the first data row of table 900). Further, if the requestor of the instant message invitation is BG Boss (i.e., the entry in the Identify of Requestor column in the second data row of table 900), then the backup invitee is Howard Jones (i.e., the entry in the Backup Invitee column in the second data row of table 900).

Computing System

Figure 10:
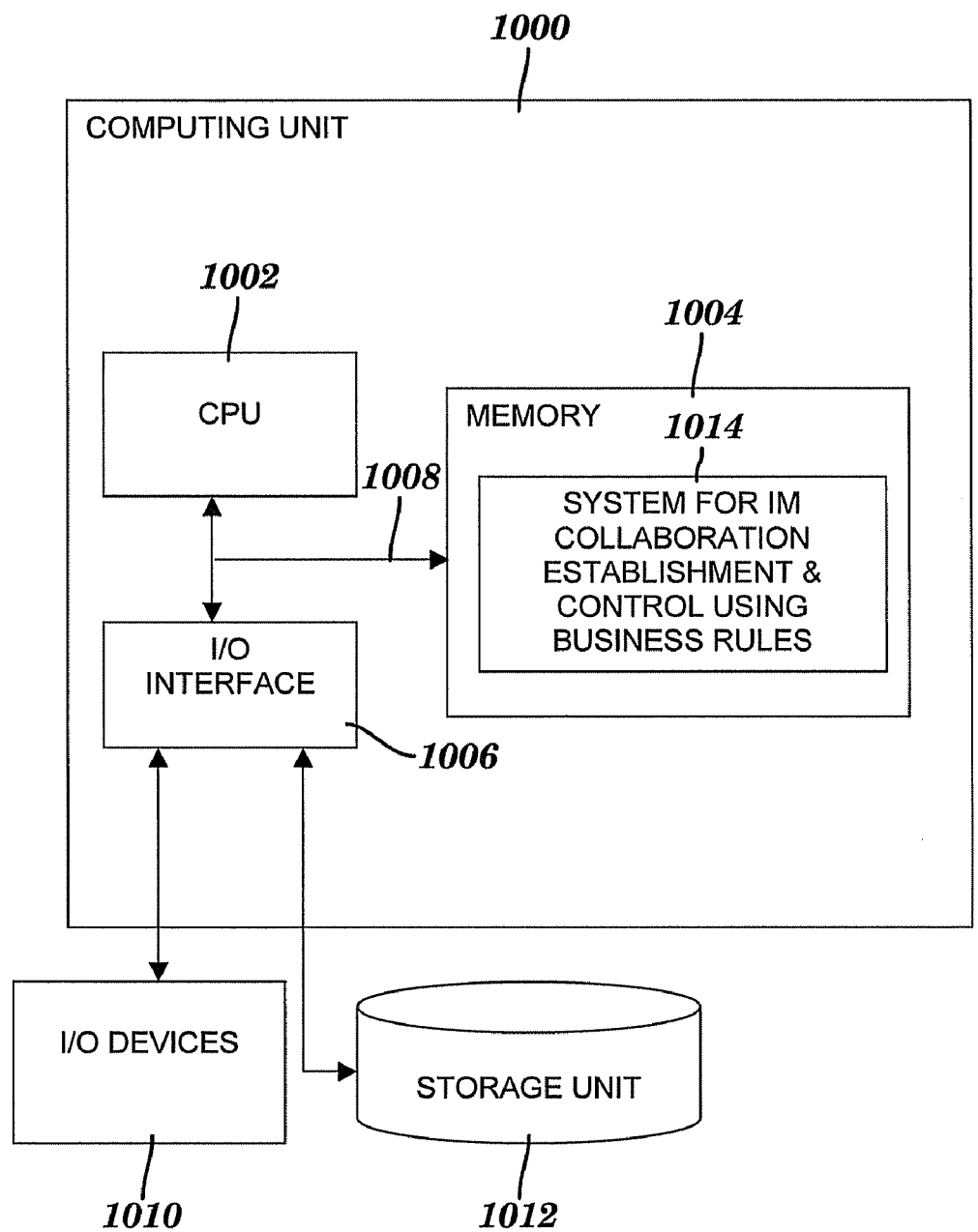
FIG. 10 is a block diagram of a computing system that is included in the system of FIG. 1 and that implements the processes of FIGS. 2-4, 5A-5B and 6A-6B, in accordance with embodiments of the present invention.

FIG. 10 is a block diagram of a computing system that is included in the system of FIG. 1 and that implements the processes of FIGS. 2-4, 5A, 5B, 6A and 6B, in accordance with embodiments of the present invention. Computing unit 1000 generally comprises a central processing unit (CPU) 1002, a memory 1004, an input/output (I/O) interface 1006, a bus 1008, I/O devices 1010 and a storage unit 1012. CPU 1002 performs computation and control functions of computing unit 1000. CPU 1002 may comprise a single processing unit, or be distributed across one or more processing units in one or more locations (e.g., on a client and server).

Memory 1004 may comprise any known type of data storage and/or transmission media, including bulk storage, magnetic media, optical media, random access memory (RAM), read-only memory (ROM), a data cache, a data object, etc. Cache memory elements of memory 1004 provide temporary storage of at least some program code (e.g., system for IM collaboration establishment and control using business rules 1014) in order to reduce the number of times code must be retrieved from bulk storage during execution. Moreover, similar to CPU 1002, memory 1004 may reside at a single physical location, comprising one or more types of data storage, or be distributed across a plurality of physical systems in various forms. Further, memory 1004 can include data distributed across, for example, a LAN, WAN or storage area network (SAN) (not shown).

I/O interface 1006 comprises any system for exchanging information to or from an external source. I/O devices 1010 comprise any known type of external device, including a display monitor, keyboard, mouse, printer, speakers, handheld device, printer, facsimile, etc. Bus 1008 provides a communication link between each of the components in computing system 1000, and may comprise any type of transmission link, including electrical, optical, wireless, etc.

I/O interface 1006 also allows computing system 1000 to store and retrieve information (e.g., program instructions or data) from an auxiliary storage device 1012. The auxiliary storage device may be a non-volatile storage device such as a magnetic disk drive or an optical disk drive (e.g., a CD-ROM drive which receives a CD-ROM disk). Computing system 1000 can store and retrieve information from other auxiliary storage devices (not shown), which can include a direct access storage device (DASD) (e.g., hard disk or floppy diskette), a magneto-optical disk drive, a tape drive, or a wireless communication device.

Memory 1004 includes a system 1014 for IM collaboration establishment and control using business rules, which implements the processes of FIGS. 2-4, 5A, 5B, 6A and 6B. Further, memory 1004 may include other systems not shown in FIG. 10, such as an operating system (e.g., Linux) that runs on CPU 1002 and provides control of various components within and/or connected to computing unit 1000.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code of a system 1014 for using business rules to control instant message collaborations for use by or in connection with a computing system 1000 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 1004, ROM, a rigid magnetic disk and an optical disk. Current examples of optical disks include compact disk-read-only memory (CD-ROM), compact disk-read/write (CD-R/W) and DVD.

Any of the components of the present invention can be deployed, managed, serviced, etc. by a service provider that offers to deploy or integrate computing infrastructure with respect to the process for using business rules to control instant message collaborations of the present invention. Thus, the present invention discloses a process for supporting computer infrastructure, comprising integrating, hosting, maintaining and deploying computer-readable code into a computing system (e.g., computing unit 1000), wherein the code in combination with the computing system is capable of performing a method of using business rules to control instant message collaborations.

In another embodiment, the invention provides a business method that performs the process steps of the invention on a subscription, advertising and/or fee basis. That is, a service provider, such as a Solution Integrator, can offer to create, maintain, support, etc. a process of using business rules to control instant message collaborations of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. For example, the business rules used in the present invention can be modified to control invitations to join real-time collaborations (e.g., web conferencing) other than IM collaborations. Accordingly, the appended claims are intended to encompass all such modifications and changes as fall within the true spirit and scope of this invention.

What is claimed is:

1. A computer-implemented method for using business rules to control invitations to participate in instant message collaborations, comprising:
    identifying, by a computing system, a primary invitee to be invited to participate in an instant message (IM) collaboration via a first instant message to be sent at a specified time, wherein said first instant message includes an invitation to said primary invitee to participate in said IM collaboration;
    subsequent to said identifying said primary invitee, said computing system applying a business rule associated with said primary invitee, wherein said business rule associates said primary invitee with a valid invitation time period during which said primary invitee is allowed to receive said invitation;
    determining, by a processor of said computing system and in response to said applying, that said specified time at which said first instant message is to be sent is not included in said valid invitation time period during which said primary invitee is allowed to receive said invitation to participate in said IM collaboration; and
    automatically inviting, via a second instant message sent by said computing system and in response to said determining said specified time at which said first instant message is to be sent is not included in said valid invitation time period during which said primary invitee is allowed to receive said invitation to participate in said IM collaboration, a backup invitee to participate in said IM collaboration.

2. The method of claim 1, further comprising after said determining that said specified time is not included in said valid invitation time period:
    identifying, by said computing system, said backup invitee to be invited to participate in said IM collaboration via said second instant message to be sent at a second specified time;
    setting, by said computing system, said backup invitee as a new primary invitee;
    applying, by said computing system, a second business rule associated with said new primary invitee;
    determining, by said computing system and in response to said applying said second business rule, that said second specified time is within a second valid invitation time period associated with said new primary invitee by said second business rule; and
    responsive to said determining that said second specified time is within said second valid invitation time period, said computing system adding said new primary invitee as a participant in said IM collaboration.

3. The method of claim 2, wherein said identifying said primary invitee to be invited to participate in said IM collaboration includes identifying a credential of said primary invitee required for participation in one or more IM collaborations, and wherein said method further comprises, responsive to said applying said second business rule, said computing system determining that said credential of said primary invitee is included in a set of one or more predefined credentials required for participation in said IM collaboration, wherein said adding said new primary invitee as said participant in said IM collaboration is further responsive to said determining that said credential of said primary invitee is included in said set of one or more predefined credentials.

4. A computer-implemented method of using business rules to control invitations to participate in instant message collaborations, said method comprising:
    inviting, via a first instant message sent by a computing system, a primary invitee to participate in an instant message (IM) collaboration, wherein said first instant message includes an invitation to said primary invitee to participate in said IM collaboration;
    applying, by said computing system, a business rule associated with said primary invitee;
    determining, by said computing system and in response to said applying, that said primary invitee is unavailable to participate in said IM collaboration, wherein said determining that said primary invitee is unavailable comprises determining that said computing system receives no response to said first instant message from said primary invitee within a predefined time period, and wherein said predefined time period is included in said business rule;
    responsive to said determining that said computing system receives no response to said first instant message from said primary invitee within said predefined time period, a processor of said computing system revoking said invitation to said primary invitee to participate in said IM collaboration;
    automatically inviting, via a second instant message sent by said computing system and consequent to said determining that said primary invitee is unavailable to participate in said IM collaboration, a backup invitee to participate in said IM collaboration;
    said computing system determining a requestor of said invitation, wherein said requestor initiates a sending of said first instant message via which said primary invitee is invited to participate in said IM collaboration, wherein said business rule identifies said requestor; and
    in response to said determining said requestor, said computing system selecting said backup invitee from a plurality of backup invitees associated with said primary invitee, wherein said selecting said backup invitee is based on said requestor being identified in said business rule and based on said requestor initiating said sending of said first instant message.

5. The method of claim 4, further comprising after said determining that said primary invitee is unavailable:
   setting, by said computing system, said backup invitee as a new primary invitee;
   applying, by said computing system, a second business rule associated with said new primary invitee;
   determining, by said computing system and in response to said applying said second business rule, that said new primary invitee is available to participate in said IM collaboration; and
   adding, by said computing system, said new primary invitee as a participant in said IM collaboration.

6. The method of claim 5, further comprising dynamically updating said second business rule subsequent to said setting said backup invitee as said primary invitee and prior to said applying said second business rule.

7. The method of claim 5, further comprising:
   identifying an alert and an alert receiver in said business rule; and
   sending said alert by said computing system and to said alert receiver, wherein said alert includes a notification that said invitation is revoked via said revoking.

8. A computer program product, comprising a non-transitory computer-readable storage medium having a computer-readable program code stored therein, said computer-readable program code comprising an algorithm adapted to implement the method of claim 4.

9. The method of claim 4, further comprising:
   said computing system determining that said first instant message that invites said primary invitee includes a phrase that indicates subject matter of said invitation, wherein said business rule includes said phrase; and
   in response to said determining that said first instant message includes said phrase, said computing system selecting said backup invitee from a plurality of backup invitees associated with said primary invitee, wherein said selecting said backup invitee is based on said phrase being included in said business rule and in said first instant message.

10. A computing system comprising a processor coupled to a computer-readable memory unit, said memory unit comprising a software application and instructions that when executed by said processor implement a method of using business rules to control invitations to participate in instant message collaborations, said method comprising:
    inviting, via a first instant message sent by said computing system, a primary invitee to participate in an instant message (IM) collaboration, wherein said first instant message includes an invitation to said primary invitee to participate in said IM collaboration;
    applying a business rule associated with said primary invitee;
    responsive to said applying, determining that said primary invitee is unavailable to participate in said IM collaboration, wherein said determining that said primary invitee is unavailable comprises determining that said computing system receives no response to said first instant message from said primary invitee within a predefined time period, and wherein said predefined time period is included in said business rule;
    responsive to said determining that said computing system receives no response to said first instant message from said primary invitee within said predefined time period, revoking said invitation to said primary invitee to participate in said IM collaboration;
    responsive to said determining that said primary invitee is unavailable to participate in said IM collaboration, automatically inviting, via a second instant message sent by said computing system, a backup invitee to participate in said IM collaboration;
    determining a requestor of said invitation, wherein said requestor initiates a sending of said first instant message via which said primary invitee is invited to participate in said IM collaboration, wherein said business rule identifies said requestor; and
    responsive to said determining said requestor, selecting said backup invitee from a plurality of backup invitees associated with said primary invitee, wherein said selecting said backup invitee is based on said requestor being identified in said business rule and based on said requestor initiating said sending of said first instant message.

11. The computing system of claim 10 wherein said method further comprises after said determining that said primary invitee is unavailable:
    setting, by said computing system, said backup invitee as a new primary invitee;
    applying, by said computing system, a second business rule associated with said new primary invitee;
    determining, by said computing system and in response to said applying said second business rule, that said new primary invitee is available to participate in said IM collaboration; and
    adding, by said computing system, said new primary invitee as a participant in said IM collaboration.

12. A process for supporting computing infrastructure, said process comprising providing at least one support service for at least one of creating, integrating, hosting, maintaining, and deploying computer-readable code in a computing system, wherein the code in combination with the computing system is capable of performing a method of using business rules to control invitations to participate in instant message collaborations, said method comprising:
    inviting, via a first instant message sent by said computing system, a primary invitee to participate in an instant message (IM) collaboration, wherein said first instant message includes an invitation to said primary invitee to participate in said IM collaboration;
    applying a business rule associated with said primary invitee;
    responsive to said applying, determining that said primary invitee is unavailable to participate in said IM collaboration, wherein said determining that said primary invitee is unavailable comprises determining that said computing system receives no response to said first instant message from said primary invitee within a predefined time period, and wherein said predefined time period is included in said business rule;
    responsive to said determining that said computing system receives no response to said first instant message from said primary invitee within said predefined time period, revoking said invitation to said primary invitee to participate in said IM collaboration;
    responsive to said determining that said primary invitee is unavailable to participate in said IM collaboration, automatically inviting, via a second instant message sent by said computing system, a backup invitee to participate in said IM collaboration;

determining a requestor of said invitation, wherein said requestor initiates a sending of said first instant message via which said primary invitee is invited to participate in said IM collaboration, wherein said business rule identifies said requestor; and responsive to said determining said requestor, selecting said backup invitee from a plurality of backup invitees associated with said primary invitee, wherein said selecting said backup invitee is based on said requestor being identified in said business rule and based on said requestor initiating said sending of said first instant message.

13. The process of claim 12, wherein said method further comprises after said determining that said primary invitee is unavailable:

setting, by said computing system, said backup invitee as a new primary invitee;

applying, by said computing system, a second business rule associated with said new primary invitee;

determining, by said computing system and in response to said applying said second business rule, that said new primary invitee is available to participate in said IM collaboration; and adding, by said computing system, said new primary invitee as a participant in said IM collaboration.

* * * * *